United States Patent [19]
Anderson

[11] Patent Number: 4,521,312
[45] Date of Patent: * Jun. 4, 1985

[54] APPARATUS AND METHOD FOR SEPARATING A MIXTURE OF THREE LIQUIDS

[76] Inventor: Edward M. Anderson, 2620 E. Medicine Lake Blvd., Minneapolis, Minn. 55441

[*] Notice: The portion of the term of this patent subsequent to Mar. 13, 2001 has been disclaimed.

[21] Appl. No.: 466,148

[22] Filed: Feb. 14, 1983

Related U.S. Application Data

[63] Continuation-in-part of Ser. No. 374,344, May 3, 1982, Pat. No. 4,436,630.

[51] Int. Cl.³ .................. C02F 1/40; B01D 21/24; B01D 12/00
[52] U.S. Cl. .................. 210/744; 210/199; 210/533; 210/119; 210/123
[58] Field of Search .......... 210/740, 744, 799, 800, 210/532.1, 533, 537, 540, 98, 114, 115, 119, 123, 110, 104; 137/172, 173, 192, 395, 397, 398, 423

[56] References Cited

U.S. PATENT DOCUMENTS

| | | | |
|---|---|---|---|
| 657,146 | 9/1900 | Williamson | 210/110 |
| 1,800,378 | 4/1931 | Everson | 210/123 |
| 2,193,261 | 3/1940 | Thomson | 137/172 |
| 2,459,082 | 1/1949 | McCaskell | 210/110 |
| 2,474,705 | 6/1949 | Vaughan et al. | 210/110 |
| 2,701,620 | 2/1955 | Crawford | 137/172 |
| 3,035,701 | 5/1962 | May | 210/114 |
| 3,088,592 | 5/1963 | Clark | 210/114 |
| 3,318,448 | 5/1967 | Fryer | 210/123 |
| 3,443,692 | 5/1969 | Halsey | 210/114 |
| 4,055,499 | 10/1977 | Laxo | 210/119 |
| 4,436,630 | 3/1984 | Anderson | 210/119 |

*Primary Examiner*—Richard V. Fisher
*Assistant Examiner*—Wanda L. Millard
*Attorney, Agent, or Firm*—Henry C. Kovar

[57] ABSTRACT

A system for physically separating a mixture of a first least dense liquid and a second medial density liquid, and a third most dense liquid has an upright container with a liquid inlet, a bottom outlet adjacent the bottom and having a flow control valve, a bottom float in the container but above the bottom outlet, a lower outlet above the bottom float and having a flow control valve, a lower float above the lower outlet and operatively connected to the lower control valve, a second float above the lower float, an upper outlet above the second float, and an upper float adjacent to or above the upper outlet, the bottom and lower and second floats are connected in parallel with the lower float being connected to the lower outlet valve, and the second and upper floats are connected in series to the upper outlet valve; and the bottom float connected to the bottom valve; the lower and second floats are fillable with and sink in the least dense liquid and rise in the medial density liquid, the bottom float is filled or ballasted to sink in the least and medial density liquids and to rise in the most dense liquid, the upper float is air filled and rises in all three liquids.

13 Claims, 1 Drawing Figure

APPARATUS AND METHOD FOR SEPARATING A MIXTURE OF THREE LIQUIDS

This is a continuation-in-part of my co-pending U.S. Ser. No. 374,344 filed on May 3, 1982 and now U.S. Pat. No. 4,436,630.

BACKGROUND OF THE INVENTION

1. Field of the Invention

This invention pertains to an apparatus and a method for separating a mixture of three different liquids at least, medial and greatest specific gravities, for example, a mixture of oil, water and creosote from a settling pound in a railroad yard.

2. The Prior Art

The prior art separators have featured a two float control for separating two liquids, specifically one float for on a lower outlet for water and a second float for on an upper outlet for oil. Specific examples of this prior art are U.S. Pat. Nos. 2,315,017 and 4,055,499. These prior art devices do not perceive the need for separating three liquids nor do they provide a solution to achieve separation, nor do they anticipate or solve the problem of keeping the stratification levels away from open outlets in order to separate more pure liquids.

OBJECTS OF THE PRESENT INVENTION

It is an object of the present invention to provide an improved apparatus for separating a mixture of three different liquids.

It is an object of the present invention to provide an improved apparatus having separate but electrically interconnected floats for opening valves and separating a mixture of three different liquids.

It is an object of the present invention to provide an improved method of separating a mixture of three different liquids.

SUMMARY OF THE INVENTION

In accordance with the principles of the present invention, apparatus for separating a mixture of a first least dense liquid, and second and medial density liquid and a third and most dense liquid has an upright settling container with an inlet for the mixture of liquids, an upper outlet under the control of a second float for passing least dense liquid, a lower outlet under the control of a lower float for passing medial density liquid, and a bottom outlet under the control of a bottom float for passing the most dense liquid; the upper float has a specific gravity less than any of the liquids, the low float has a specific gravity inbetween the specific gravities of the least and medial density liquids, and the bottom float has a specific gravity inbetween specific gravities of the medial and most dense liquids.

A method of separating a mixture of three different density liquids has the steps of ballasting a lower float and a second float to a specific gravity inbetween the specific gravities of least and medial density liquids, ballasting a bottom float to a specific gravity inbetween the specific gravities of medial and most dense liquids, immersing the floats in the mixture, opening a lower outlet in response to raising of the lower float by a rising level of the medial density liquid, closing an upper outlet when the second float is raised, following a stratification level between the medial and a most dense liquids and opening a bottom outlet which is below the bottom float, upon the stratification level reaching a predetermined height.

AS SHOWN ON THE DRAWING

Figure 1:
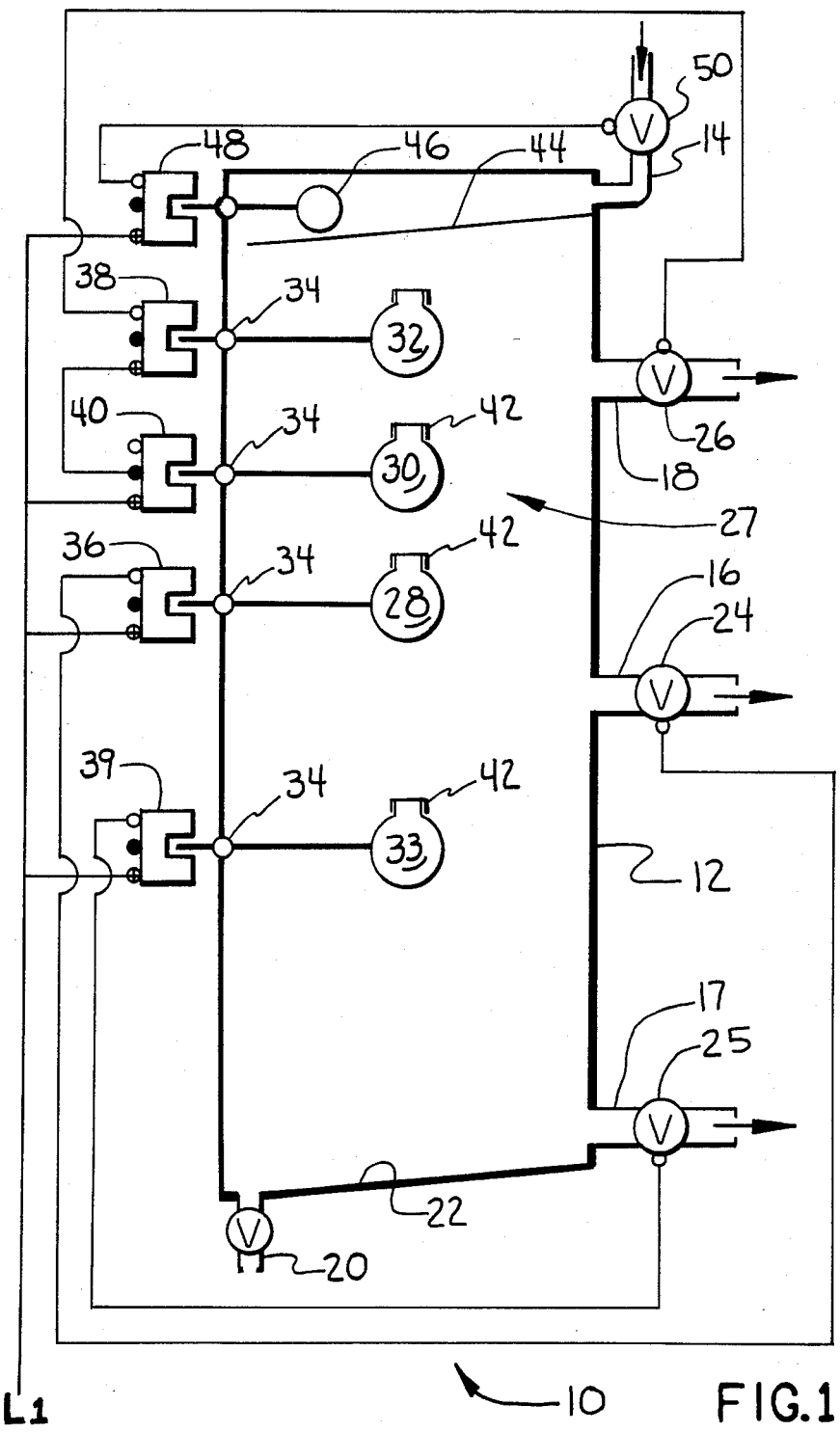
FIG. 1 is a schematic elevational side view of apparatus for separating a mixture of three liquids, the apparatus being shown empty and with wiring.

The principles of the present invention are particularly useful when embodied in and/or practiced with an apparatus for separating a mixture of three different density liquids, such as shown in FIG. 1 and generally referred to by the numeral 10. The apparatus 10 is ideally suited for separating three liquids, such as petroleum, water and creosote.

The apparatus 10 has an upright liquid container 12 having a liquid inlet 14, a lower liquid outlet 16, a bottom outlet 17, an upper liquid outlet 18, and a drain outlet 20 from the container bottom 22. A normally closed valve 24 is in the lower outlet 16 for controlling flow there through, a similar normally closed valve 26 is in the upper outlet 18 for controlling flow there through, and a similar normally closed valve 25 is in the bottom outlet 17 for controlling flow there through. The valves 24, 25, 26 are independent and are not operatively connected to each other and are preferably of a type which is either completely closed or completely open.

An upper group 27 of floats is within the container 12, specifically an upper group 27 including a low float 28 at an elevational level above the level of the lower outlet 16 and the bottom outlet 17, a second float 30 at an elevational level between the low float 28 and the upper outlet 18, and an upper float 32 at a level adjacent to or above the level of the upper outlet 18. Below the upper group 27 of floats and below the low float 28 is a bottom float 33. Each of the floats 28, 30, 32, 33 extends through the wall of the container 12 and is pivotally mounted in a fulcrum 34. The second float 30 is essentially an upper stratification float and it follows up and down an upper stratification level between least and medial dense liquids in the apparatus 10. The bottom float 33 is essentially a bottom stratification float and it follows up and down a bottom stratification level between medial and most dense liquids in the apparatus 10.

The low float 28 has a normally open switch 36 that is operatively connected to the lower valve 24. The upper float 32 likewise has a normally open switch 38 connected to the upper valve 26. The second float 30 has a normally closed switch 40 which is connected inbetween line power L1 and the upper float switch 38. The second float switch 40 and upper float switch 36 are connected in parallel to the power L1.

The bottom float 33 has a normally open switch 39 connected to the bottom valve 25. The bottom switch 39 is connected to L1 in parallel with the lower switch 36 and second switch 40.

The low, second, upper and bottom floats 28, 30, 32, 33 are each independently mounted to the container 12 and they each are operable completely independent of each other. All of the floats 28, 30, 32, 33 are hollow. The low float 28, second float 30 and bottom float 33 each may have a removable fluid tight sealing cap 42 which is removable. The low float 28 and second float 30 are filled with the least density liquid which gives these floats 28, 30 a specific gravity which is similar to and which is slightly more dense than the least dense liquid, but less dense than the medial density liquid. The upper float 32 is air filled and is of less density than any least dense liquid to be separated.

The bottom float 33 is either filled with the medial density liquid or is filled with the least dense liquid and is ballasted to have a specific gravity greater than the medial density liquid but less than the most dense liquid so that the bottom float 33 will rise in the most dense liquid and sink in the medial or least dense liquids.

At the top of the container 12 and above the float group 27 and the upper float 32 is a generally horizontal plate baffle 44 to smooth out and laminate the incoming flow of liquid. An overflow float 46 has a normally open overflow switch 48 which is connected to L1 and to a normally open inlet valve 50. If and when incoming liquid backs up on the baffle 44, the overflow float 46 rises and the switch 48 closes and the inlet valve 50 is temporarily closed which terminates incoming flow of liquid. Both the overflow switch 48 and the inlet valve may of a graduated type for adjustable flow control. The overflow switch 48 is connected to L1 in parallel with the bottom switch 39, lower switch 36 and second switch 40.

In the practice of the method of the present invention, a mixture of three liquids of different densities is admitted into the container 12 through the inlet 14. The most dense liquid may be creosote, the medial density liquid is usually water; the least dense liquid is usually a petroleum such as crude, fuel oil, diesel, gasoline, and the like. The low float 28 and second float 30 are filled with the anticipated least dense liquid.

The bottom float 33 is filled with the anticipated medial density liquid or alternatively filled with the least dense liquid and ballasted so that the bottom float 33 has a specific gravity greater than the specific gravity of the medial density liquid; for example, if the medial liquid is anticipated to be water, the bottom float 33 may be set to have a specific gravity of 1.02, so the bottom float 33 will sink in the medial liquid.

Alternatively the floats 28, 30, 33 may be preweighted to a predetermined specific gravity and be adjustable; several well-known structures such as counterweights are known for this function.

As the apparatus 10 is shown in a normally empty state, the floats 28, 30, 32, 33 are all down and all three outlet valves 24, 25, 26 are closed.

When the apparatus 10 is filled with the least dense liquid, for example, oil, the low, second and bottom floats 28, 30, 33 remain down and the upper float 32 rises and closes switch 38 and opens the upper valve 26 allowing the least dense liquid to flow out of the upper outlet 18.

When the medial density liquid, for example, water, begins to accumulate in the lower part of the apparatus 10, the low float 28 and bottom float 33 remain down even when the level of medial density liquid is above the low outlet 16. This gives the accumulated medial density liquid (water) time to coalesce and minimize the probability of medial density liquid (oil) going out of the lower outlet 16.

When the level of the medial density liquid rises above the low float 28, the low float 28 rises andd closes switch 36 and thereby opens the lower outlet valve 24 and the medial density liquid (water) flows out of the lower outlet 16.

As the level of the medial density liquid rises, the second float 30 rises and opens switch 40 which thereby de-energizes the upper float switch 38, and if the upper float 32 is raised by any density liquid, this effectively closes the upper outlet valve 26 and terminates outlet flow of the least dense liquid. The lower valve 24 remains open and outlet flow of the medial density liquid continues until the level of the medial density liquid falls and retreats from the upper outlet 18. As the level of the medial density liquid falls, the second float 30 also falls and when switch 40 recloses, the upper valve 26 will re-open provided that the upper float 32 is raised by the presence of least dense liquid. The upper valve 26 is closed when either of the upper float 32 or second float 30 is lowered; the upper valve 26 is opened only when the second float 30 is down and the upper float 32 is up.

When most dense liquid is introduced into the apparatus 10, it settles by gravity to the bottom 22. As the quantity of most dense liquid increases, its level will move upward and cover the closed bottom outlet 17 and eventually reach the bottom float 33. When the bottom float 33 is lifted by a rising level of most dense liquid, the normally open bottom switch 39 is closed and the bottom valve 25 is opened to allow flow of the most dense liquid out of the bottom outlet 17. When the level of the most dense liquid falls, the bottom float 33 also falls and the bottom switch 39 reopens and the bottom valve 25 closes. The lower outlet 16 is positioned at an elevational level which is closer to the level of the lower float 28 than to a level of the bottom float 33, and the bottom float 33 is at a level closer to a level of the lower outlet 16 than to a level of the bottom outlet 17. The vertical spacing between the bottom outlet 17 and the lower outlet 16 is greater than a vertical spacing between the lower outlet 16 and the upper outlet 18.

It will be apparent that the low float 28, second float 30 and upper float 32 will all rise if the level of the most dense liquid were to rise to the level of these floats, and further that lower outlet 24 would be opened. The bottom outlet 17 and bottom valve 25 are sized significantly larger than the inlet 14 and the inlet valve 50. Regardless of the quantity of flow through the inlet, more liquid will flow out of the bottom outlet 17 per unit of time so that the upper level of the most dense liquid cannot rise when the bottom valve 25 is open and so that this level always drops when the bottom valve 25 is open.

This apparatus and method have several advantages. All three outlets 16, 17, 18 can be concurrently open. As the level between the medial and least dense liquid approaches the lower outlet 16, the lower outlet valve 24 is closed, because the low float 28 follows this level down. As this level approaches the upper outlet 18, the upper valve 26 closes because the second float 30 rises. The height of the container 12 and the spacing between the floats 28, 30, 32 determines the range and sensitivity of the opening and closing of the upper valve 26 and lower valve 24. The apparatus 10 lends itself to gravity flow with no pressure, or to full pressurization; a given apparatus 10 may work with either pressurized or nonpressurized.

The apparatus 10 can also be used for reclaiming mixtures of cooking oils and shortening that are physically discrete from one another. The medial density liquid need not be water; it could be a fuel oil, or a solvent. The apparatus 10 is also thought to be useful for the separation of PENTA preservative and carbon tetrachloride.

In a test of the apparatus 10, the container was sized at 800 gallons cubic capacity and used to clean a twoacre settling pond in a railroad yard. The pond was about 4½ feet deep and filled with a mixture of #5 oil, water and creosote and sludge. In seven days, the apparatus 10 extracted 64,000 gallons of re-usable creosote containing less than 3% water. There are probably over 5000 such settling ponds in the United States that need to be emptied for environmental and health enhancement and preservation.

Although other advantages may be found and realized and various and minor modifications may be suggested by those versed in the art, be it understood that I wish to embody within the scope of the patent warranted hereon, all such improvements as reasonably and properly come within the scope of my contribution to the art.

I claim as my invention:

1. Apparatus for physically separating a mixture of three liquids, a first of the liquids being least dense, a second being a medial density liquid and a third being a most dense liquid, said apparatus comprising
   (a) an upright liquid container;
   (b) means defining a liquid inlet into the container for introduction of the mixture into the container;
   (c) means defining a lower outlet for passing the medial density liquid from the container;
   (d) a lower float in the container and at an elevational level above the level of the lower outlet;
   (e) means in said lower outlet and operatively connected to said lower float for controlling flow through said outlet;
   (f) means defining an upper outlet from the container, said upper outlet being at an elevational level above the elevational level of the lower float;
   (g) a second float in the container and at an elevational level between the lower float and the upper outlet; and lower and second floats being of similar specific gravities which are more dense than the first liquid but less dense than the second liquid;
   (h) means in said upper outlet which are operatively connected to said second float for controlling flow through said upper outlet, said second float and upper outlet flow control means being connected in parallel with said lower float and lower outlet flow control means;
   (i) means defining a bottom outlet adjacent a bottom of the container, said bottom outlet having a valve for controlling flow therethrough; and
   (j) a bottom float at a level inbetween the lower outlet and the bottom outlet, said bottom float being operatively connected to open only the bottom outlet valve and having a specific gravity greater than the second liquid and less than the third liquid.

2. Apparatus according to claim 1, including an upper float in the container and at an elevational level above the level of the upper outlet, said upper float being connected in series between the second float and the upper outlet flow control means.

3. Apparatus according to claim 2, in which the second float includes a normally closed switch and the upper float includes a normally open switch, said float switches being electrically connected with power firstly to normally closed and secondly to normally open and then to the upper outlet flow control means.

4. Apparatus according to claim 1, in which the lower and second floats are hollow and have means for being filled with the intended and lease dense liquid, and in which the bottom float is hollow and has means for being filled with the intended medial density liquid, and floats each having means for sealing the ballast liquids therein.

5. Apparatus according to claim 2, in which the lower and second floats are filled with the least dense liquid, and in which the bottom float is filled with the medial density liquid and in which the upper float is filled with air.

6. Apparatus according to claim 1, in which the bottom float and the lower float each have a switch, said switches being connected in parallel, and in which the second float has a switch connected independently of either the bottom or lower switch.

7. Apparatus according to claim 1, in which the lower outlet is closer to the lower float than to the bottom float.

8. Apparatus for continually physically separating a third and most dense liquid from a first and least dense liquid and from a second and medial density liquid comprising
   (a) a liquid container having means defining an inlet for a mixture of the first and second and third liquids;
   (b) means defining a lower outlet centrally located in the container for the medial density liquid, said lower outlet having a valve for controlling flow therethrough;
   (c) means defining an upper outlet substantially above the lower outlet, said upper outlet being for the least dense liquid and having a valve for controlling flow therethrough;
   (d) means defining a bottom outlet at a level below the lower outlet, said bottom outlet being for the most dense liquid and having a valve for controlling flow therethrough;
   (e) a lower float above the lower outlet and connected to the lower outlet valve for opening the lower valve;
   (f) an upper float above the upper outlet and connected to the upper outlet valve;
   (g) a bottom float above the bottom outlet and connected to the bottom outlet valve; said bottom float having a higher specific gravity than the lower float and the lower float has a higher specific gravity than the upper float.

9. Apparatus according to claim 8, in which all of said floats and their respective outlets are connected in parallel to a source of line power.

10. A method of separating a mixture of a first and least dense liquid, a second and medial density liquid, and a third and most dense liquid comprising the steps of
   (a) ballasting a lower and a second float to a specific gravity inbetween the specific gravities of the least and medial density liquids;
   (b) ballasting a bottom float to a specific gravity inbetween the specific gravities of the medial density and most dense liquids;
   (c) immersing the floats in the mixture;
   (d) opening a lower outlet in response to the raising of said lower float by a rising level of the medial density liquid and normally closing the lower outlet in the absence of a predetermined level of medial density liquid;
   (e) following upwardly a stratification level between the least and medial dense liquids with the said second float;

(f) closing an upper outlet for the least dense liquid when the second float is raised by a medial density liquid and (g) following a bottom stratification level between the most and medial density liquids with the bottom float and closing a bottom outlet below the bottom float when the bottom stratification level falls to or below a lesser predetermined height.

11. The method of claim 10, including the step of ballasting the bottom float with the most dense liquid.

12. The method of claim 10, including the step of maintaining the bottom stratification level closer to the lower outlet than to the bottom outlet.

13. The method of claim 10, in which the first liquid is a petroleum fuel, the second liquid is water and the third liquid is creosote.

* * * * *